(12) United States Patent
Etoh et al.

(10) Patent No.: US 9,390,733 B2
(45) Date of Patent: Jul. 12, 2016

(54) MICROWAVE-ASSISTED MAGNETIC RECORDING (MAMR) HEAD WITH AN INCLINED AND RECESSED MAIN POLE STRUCTURE

(71) Applicant: HGST Netherlands B.V., Amsterdam (NL)

(72) Inventors: Kimitoshi Etoh, Odawara (JP);
Kazuhiko Hosomi, Fujisawa (JP);
Mikito Sugiyama, Odawara (JP);
Tomohiro Okada, Odawara (JP)

(73) Assignee: HGST Netherlans B.V., Amsterdam (NL)

( * ) Notice: Subject to any disclaimer, the term of this patent is extended or adjusted under 35 U.S.C. 154(b) by 6 days.

(21) Appl. No.: 14/051,372

(22) Filed: Oct. 10, 2013

(65) Prior Publication Data
US 2015/0103434 A1  Apr. 16, 2015

(51) Int. Cl.
*G11B 5/147* (2006.01)
*G11B 5/31* (2006.01)
*G11B 5/00* (2006.01)

(52) U.S. Cl.
CPC .............. *G11B 5/3163* (2013.01); *G11B 5/314* (2013.01); *G11B 2005/0024* (2013.01)

(58) Field of Classification Search
CPC .................................................. G11B 5/1278
USPC ........ 360/125.08–125.15, 125.3, 125.71, 128
See application file for complete search history.

(56) References Cited

U.S. PATENT DOCUMENTS

| | | | |
|---|---|---|---|
| 7,565,732 B2 | 7/2009 | Le et al. | |
| 7,818,875 B2 | 10/2010 | Balamame et al. | |
| 8,233,233 B1 * | 7/2012 | Shen et al. | 360/125.03 |
| 8,456,967 B1 * | 6/2013 | Mallary | 369/13.33 |
| 2010/0073806 A1 | 3/2010 | Koui et al. | |
| 2011/0038081 A1 | 2/2011 | Contreras et al. | |
| 2011/0090603 A1 | 4/2011 | Bai | |
| 2011/0273800 A1 | 11/2011 | Takano et al. | |
| 2012/0147502 A1 | 6/2012 | Udo et al. | |
| 2013/0050866 A1 * | 2/2013 | Matsubara et al. | 360/31 |

* cited by examiner

*Primary Examiner* — Gustavo Polo
(74) *Attorney, Agent, or Firm* — Zilka-Kotab, PC

(57) ABSTRACT

In one embodiment, a magnetic head includes a main pole configured to emit a recording magnetic field for affecting a magnetic medium, the main pole configured to serve as a first electrode and having a front portion at an air bearing surface (ABS) of the magnetic head and a rear portion extending from the front portion in an element height direction perpendicular to the ABS, wherein an upper surface of the front portion of the main pole is angled with respect to a plane of deposition at a first angle of inclination of greater than 0°, and wherein at least a portion of an upper surface of the rear portion of the main pole is angled at a first angle of declination greater than 0° with respect to the plane of deposition, an upper shield positioned above the main pole, the upper shield configured to serve as a second electrode, and a microwave oscillator positioned between the main pole and the upper shield at the ABS.

14 Claims, 15 Drawing Sheets

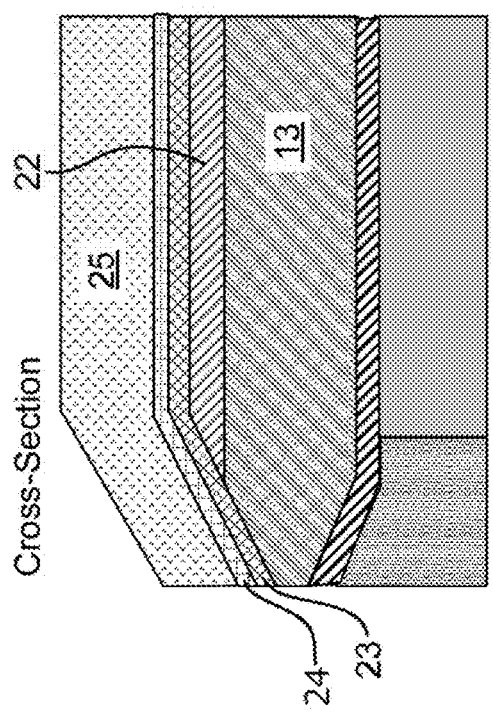
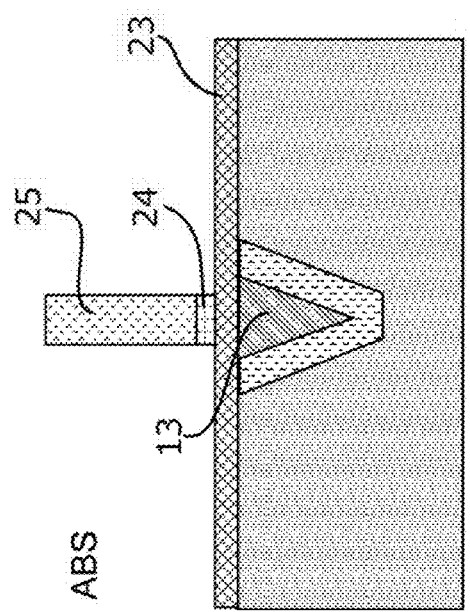
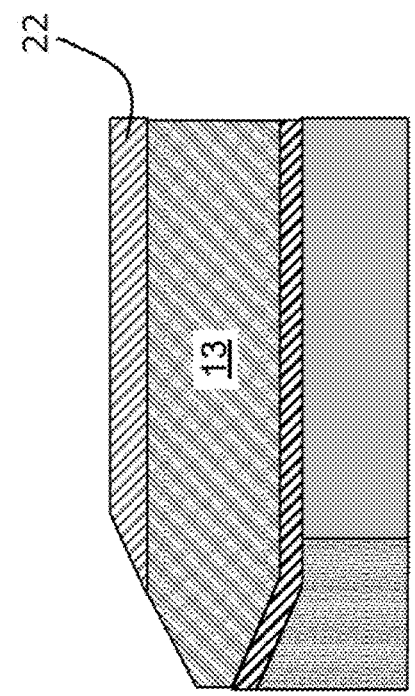
FIG. 10A
FIG. 10B
FIG. 10C

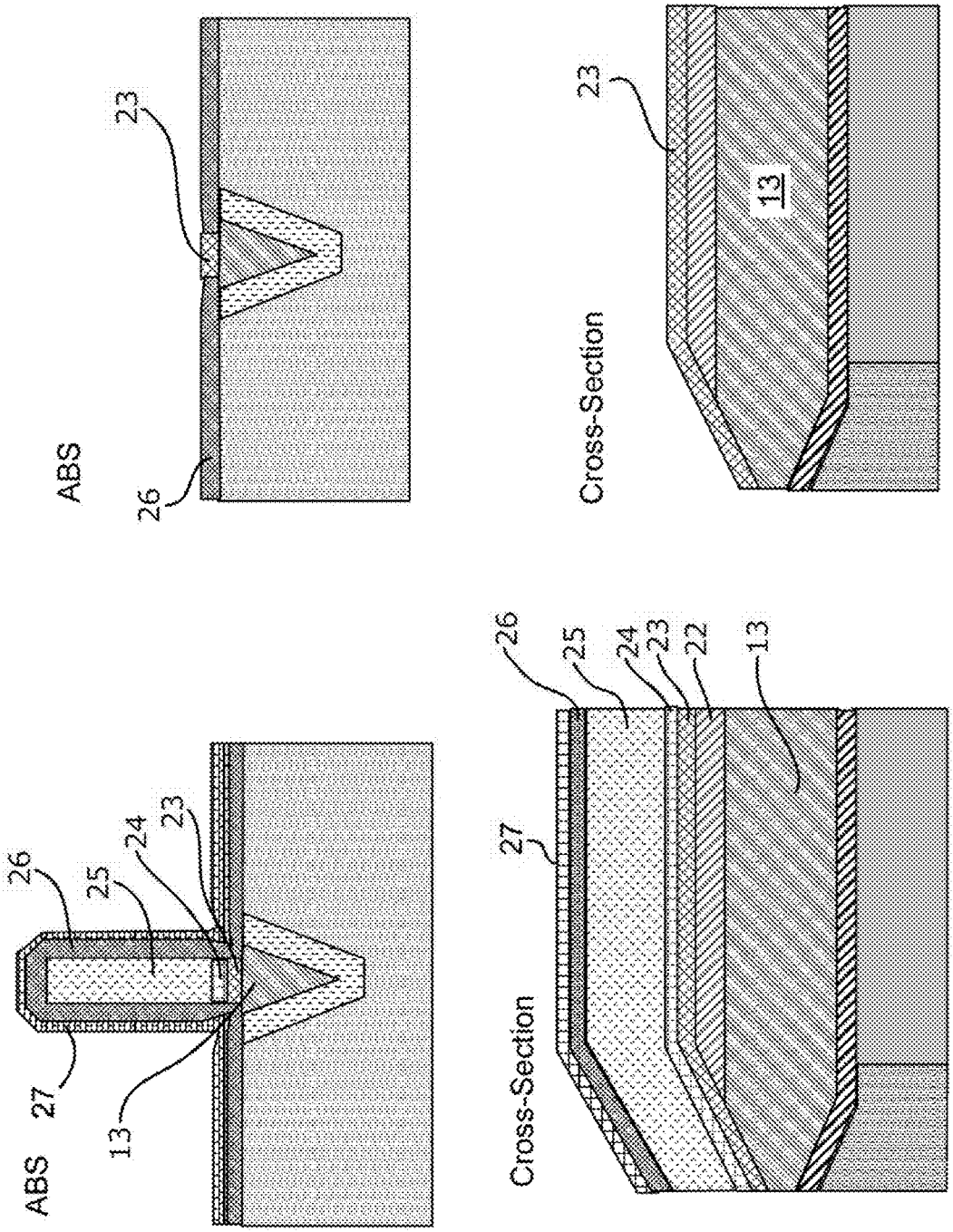

Top View

Cross-Section

MICROWAVE-ASSISTED MAGNETIC RECORDING (MAMR) HEAD WITH AN INCLINED AND RECESSED MAIN POLE STRUCTURE

FIELD OF THE INVENTION

The present invention relates to a microwave assisted magnetic recording (MAMR) head, and more particularly, to a MAMR head having a recessed main pole structure.

BACKGROUND

The heart of a computer is a magnetic hard disk drive (HDD) which typically includes a rotating magnetic disk, a slider that has read and write heads, a suspension arm above the rotating disk, and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. FIG. 1 is a schematic diagram of a recording head 100 of a perpendicular magnetic recording (PMR) system used with hard disks. The circumference of a main magnetic pole 13 having an inverted triangular shape is surrounded by a non-magnetic layer to form magnetic gaps (a trailing gap 26 on a trailing side thereof and a side gap 261 on sides thereof in a cross-track direction). In some embodiments, a leading gap may also be present. In more approaches, a trailing shield 16 may be provided as well. Furthermore, an exterior of the main magnetic pole is shielded by a magnetic body (shield) 161 for absorbing any surplus magnetic fields.

The simplest method for achieving bit size reduction involves scaling down the size of the main pole. When the main pole of a conventional PMR head is scaled down in order to reduce the bit size, the area of the main pole at the air bearing surface (ABS) is reduced, and this is accompanied by a reduction in the emitted magnetic flux that precludes the generation of the recording magnetic field used for writing data to the medium. A microwave assisted magnetic recording (MAMR) system is designed to compensate for the reduction in the recording magnetic field.

FIG. 2 shows a magnetic head 200 of an MAMR system. As shown, in a MAMR head, a microwave oscillator or spin torque oscillator (STO) 23 is used for generating a high-frequency magnetic field and is typically formed directly on the main pole 13. MAMR systems are characterized in that the high-frequency magnetic field oscillated by the microwave oscillator is applied to the recording medium to reduce the coercivity of the recording medium so that data recording is possible even in a comparatively weak magnetic field emitted from a small main pole.

However, there are inherent difficulties associated with the production of MAMR heads in that, because recording is performed employing both the main pole and the microwave oscillator, the size specifications of each part must be simultaneously satisfied while ensuring the relative positional relationship between the two parts is maintained within a constant range.

FIGS. 3 and 4 show the structure of a PMR 300 and an MAMR head 400, respectively. The lower section of FIGS. 3 and 4 are cross-sectional views, while the upper section offers a top view of the main pole sections as seen from directly above. In the MAMR head shown in FIG. 4, the ABS serves as a common end surface of the flare height and STO height, and the flare height and STO height are simultaneously determined when the device is divided at the ABS in later processing. Accordingly, to produce a satisfactory MAMR head yield, the height direction of the main pole 13 and STO element 23 must be satisfactorily aligned with high precision in advance, or some kind of measurement for relaxing the size specifications of the individual component parts is required. This makes forming MAMR heads particularly difficult.

SUMMARY

In one embodiment, a magnetic head includes a main pole configured to emit a recording magnetic field for affecting a magnetic medium, the main pole configured to serve as a first electrode and having a front portion at an air bearing surface (ABS) of the magnetic head and a rear portion extending from the front portion in an element height direction perpendicular to the ABS, wherein an upper surface of the front portion of the main pole is angled with respect to a plane of deposition at a first angle of inclination of greater than 0°, and wherein at least a portion of an upper surface of the rear portion of the main pole is angled at a first angle of declination greater than 0° with respect to the plane of deposition, an upper shield positioned above the main pole, the upper shield configured to serve as a second electrode, and a microwave oscillator positioned between the main pole and the upper shield at the ABS.

In another embodiment, a method for forming a magnetic head includes forming a main pole, the main pole being configured to serve as a first electrode and having a front portion at an ABS of the magnetic head and a rear portion extending from the front portion in an element height direction perpendicular to the ABS, forming a microwave oscillator structure above the main pole, the microwave oscillator being positioned at the ABS and extending therefrom in the element height direction, forming a mask above the microwave oscillator structure, the mask having an end portion parallel to the ABS of the magnetic head that is positioned a predetermined distance from the ABS in the element height direction, removing a back portion of the microwave oscillator using the mask to form an end of the microwave oscillator positioned the predetermined distance from the ABS in the element height direction, and removing a portion of the main pole using the mask.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIGS. 10A-10K show a process flow according to one embodiment.

DETAILED DESCRIPTION

Figure 1:
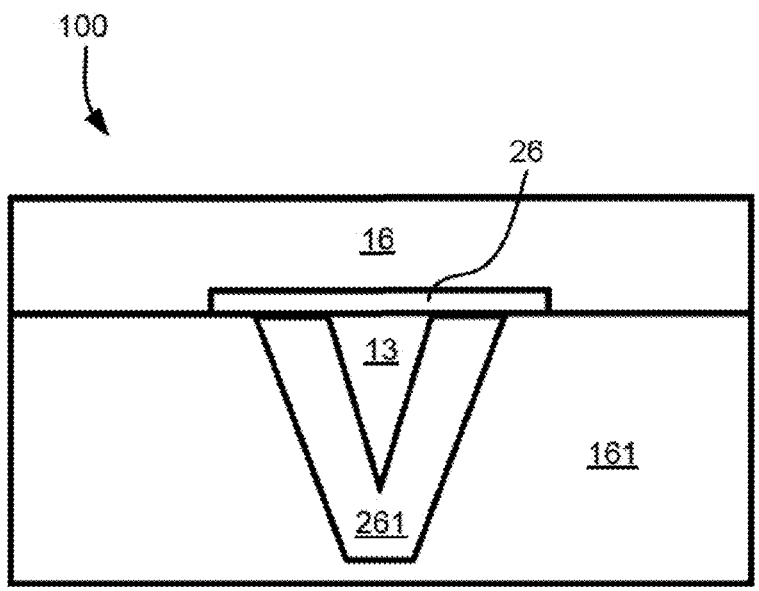
FIG. 1 is a cross-sectional view in an air bearing surface (ABS) direction of a perpendicular magnetic recording (PMR) head, according to the prior art.
Figure 2:
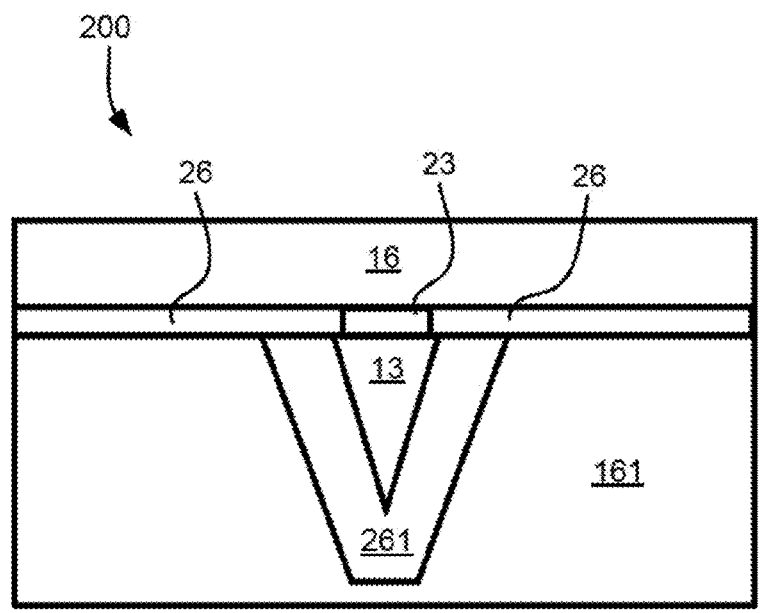
FIG. 2 is a cross-sectional view in the ABS direction of a microwave assisted magnetic recording (MAMR) recording head, according to the prior art.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a magnetic head includes a main pole configured to emit a recording magnetic field for affecting a magnetic medium, the main pole configured to serve as a first electrode and having a front portion at an air bearing surface (ABS) of the magnetic head and a rear portion extending from the front portion in an element height direction perpendicular to the ABS, wherein an upper surface of the front portion of the main pole is angled with respect to a plane of deposition at a first angle of inclination of greater than 0°, and wherein at least a portion of an upper surface of the rear portion of the main pole is angled at a first angle of declination greater than 0° with respect to the plane of deposition, an upper shield positioned above the main pole, the upper shield configured to serve as a second electrode, and a microwave oscillator positioned between the main pole and the upper shield at the ABS.

In another general embodiment, a method for forming a magnetic head includes forming a main pole, the main pole being configured to serve as a first electrode and having a front portion at an ABS of the magnetic head and a rear portion extending from the front portion in an element height direction perpendicular to the ABS, forming a microwave oscillator structure above the main pole, the microwave oscillator being positioned at the ABS and extending therefrom in the element height direction, forming a mask above the microwave oscillator structure, the mask having an end portion parallel to the ABS of the magnetic head that is positioned a predetermined distance from the ABS in the element height direction, removing a back portion of the microwave oscillator using the mask to form an end of the microwave oscillator positioned the predetermined distance from the ABS in the element height direction, and removing a portion of the main pole using the mask.

A height of a spin torque oscillator (STO) in a standard microwave assisted magnetic recording (MAMR) head is established on the basis of the desired shape (typically, a square shape) and length to ensure oscillation efficiency and intensity of the high-frequency magnetic field produced by the STO. Accordingly, there is a strict height specification to which the STO must be formed which is difficult to relax and still have acceptable head performance.

Figure 3:
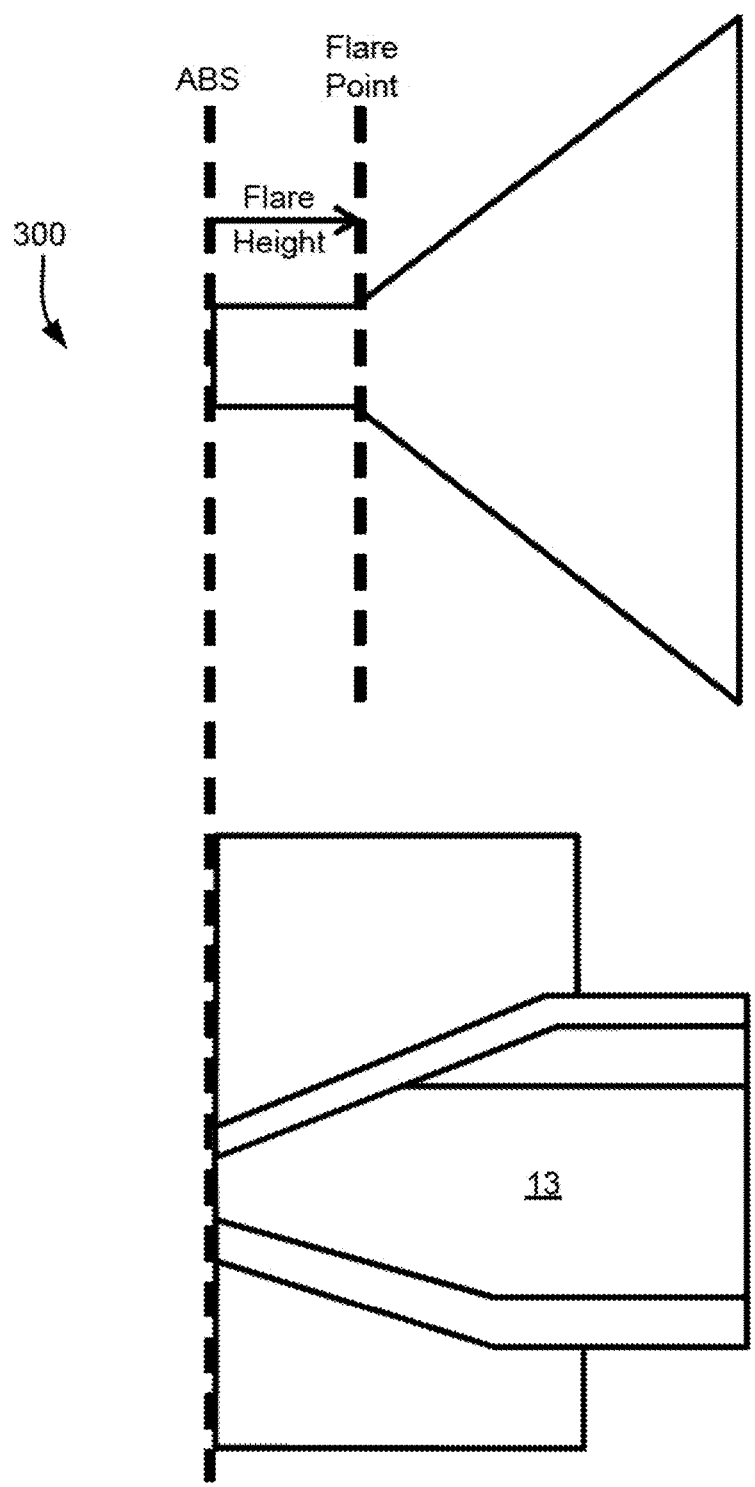
FIG. 3 is a top view and cross-sectional view of a typical PMR head, according to the prior art.
Figure 4:
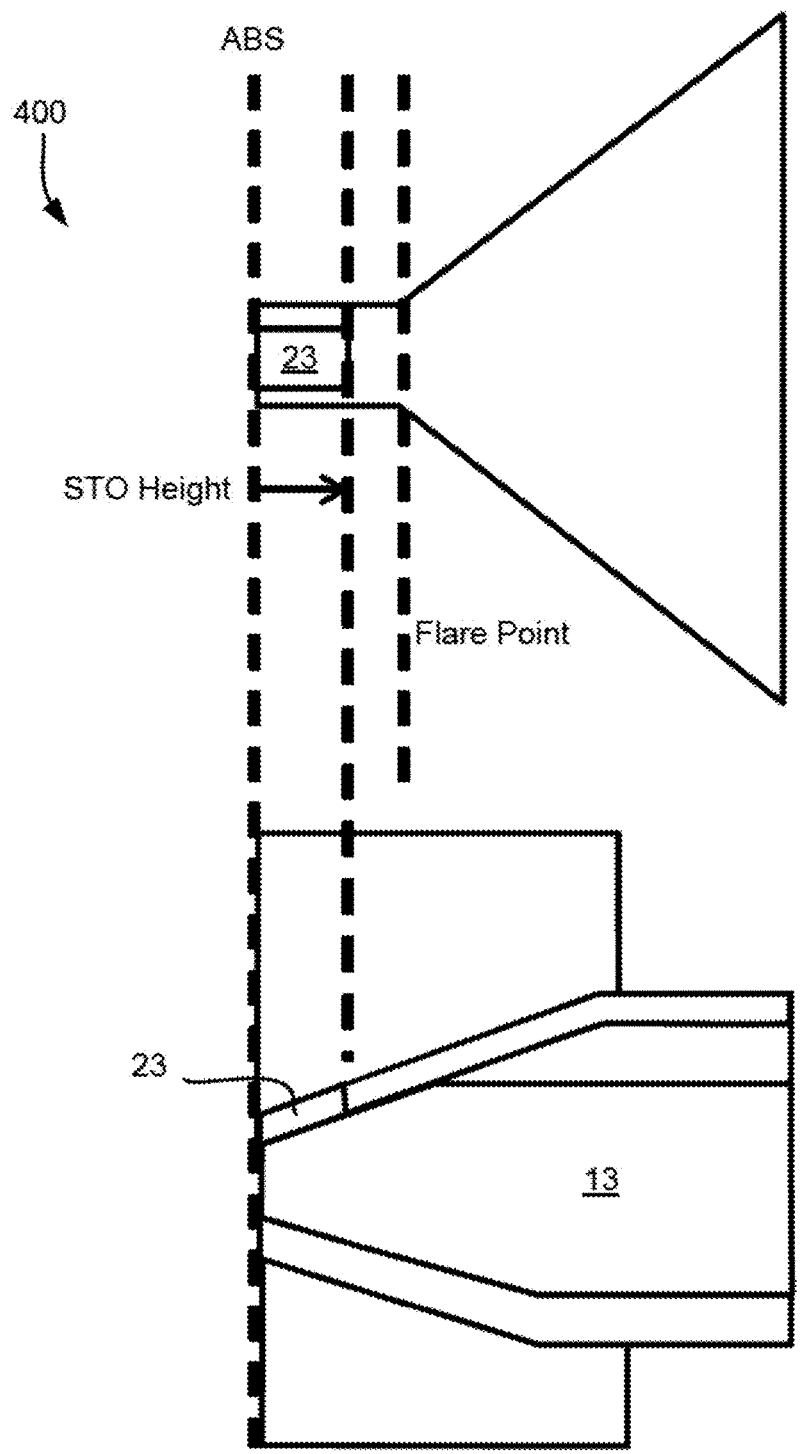
FIG. 4 is a top view and cross-sectional view of a typical MAMR head, according to the prior art.
Figure 5:
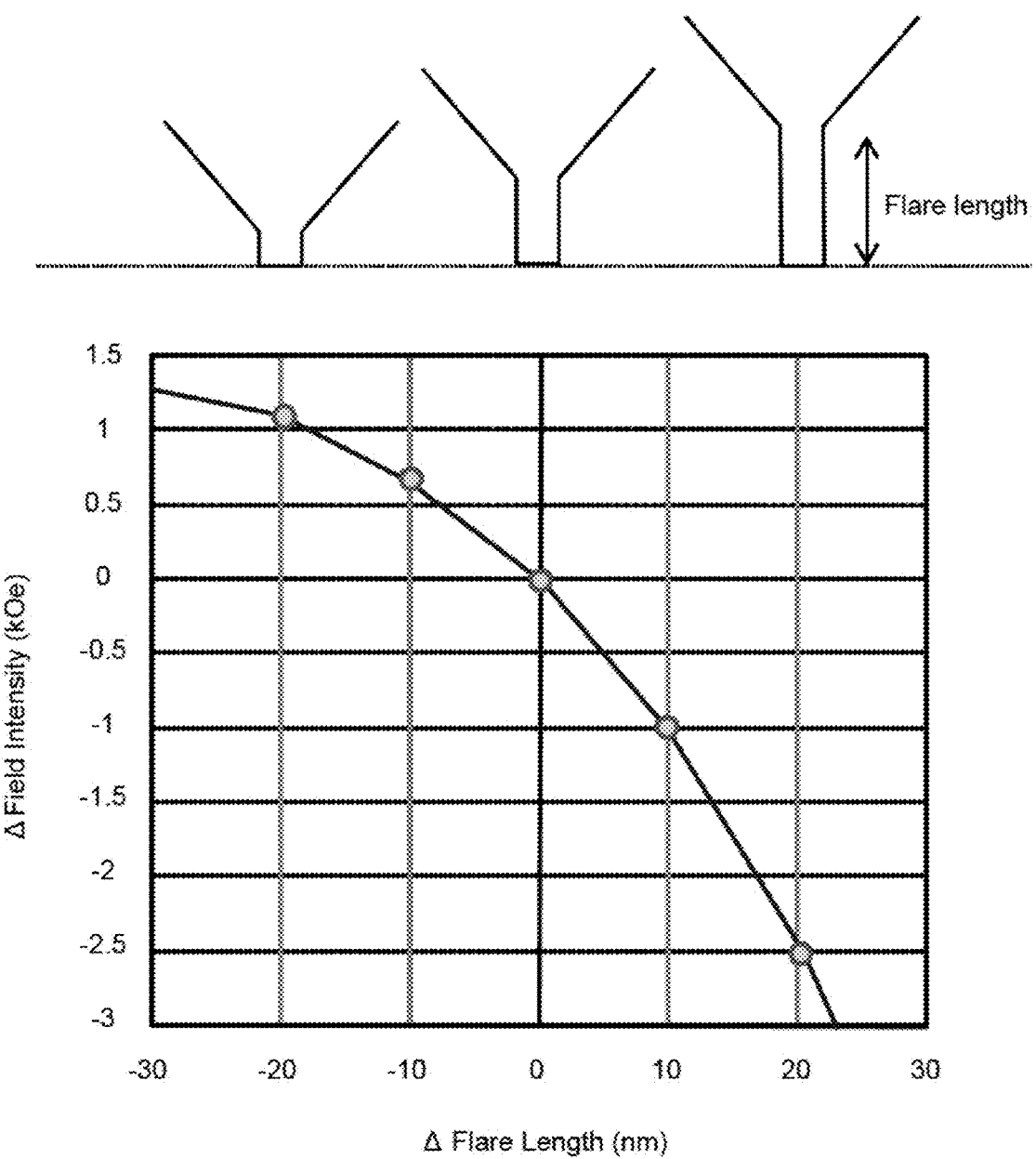
FIG. 5 is a diagram showing a relationship between flare length and magnetic field intensity, according to an exemplary embodiment.

A flare length specification is described with reference to FIG. 5. FIG. 5 shows the calculation results of the relationship between the flare length defined by FIG. 3 and the intensity of the magnetic field emitted by the main pole. It is clear from FIG. 5 that the magnetic field intensity is highly dependent upon the flare length, and that the smaller the flare length, the greater the magnetic field intensity. The recording magnetic field produced by the main pole must lie within the appropriate range for recording. That is to say, when the recording magnetic field is too weak, it precludes a signal from being written on a medium, and when it is excessively strong, magnetic field leakage to an adjacent track occurs and causes noise. A head having a flare length that ensures the supply of a magnetic field within this appropriate range is a head which satisfies the specifications.

In a structure in which the dependency of the magnetic field intensity on the flare length is small, the flare length specification is relaxed and change in the magnetic field intensity is able to be avoided irrespective of flare length fluctuations.

A head structure that ensures the provision of a magnetic recording head in which stable high-frequency magnetic field assisted recording is possible with satisfactory yield is presented herein according to various embodiments. More specifically, one embodiment is a magnetic head structure configured to provide a high-frequency magnetic field for assisted recording in which the dependency of the magnetic field intensity on the flare length is reduced so that the alignment precision effect between the main pole and STO is negligible.

Figure 6A:
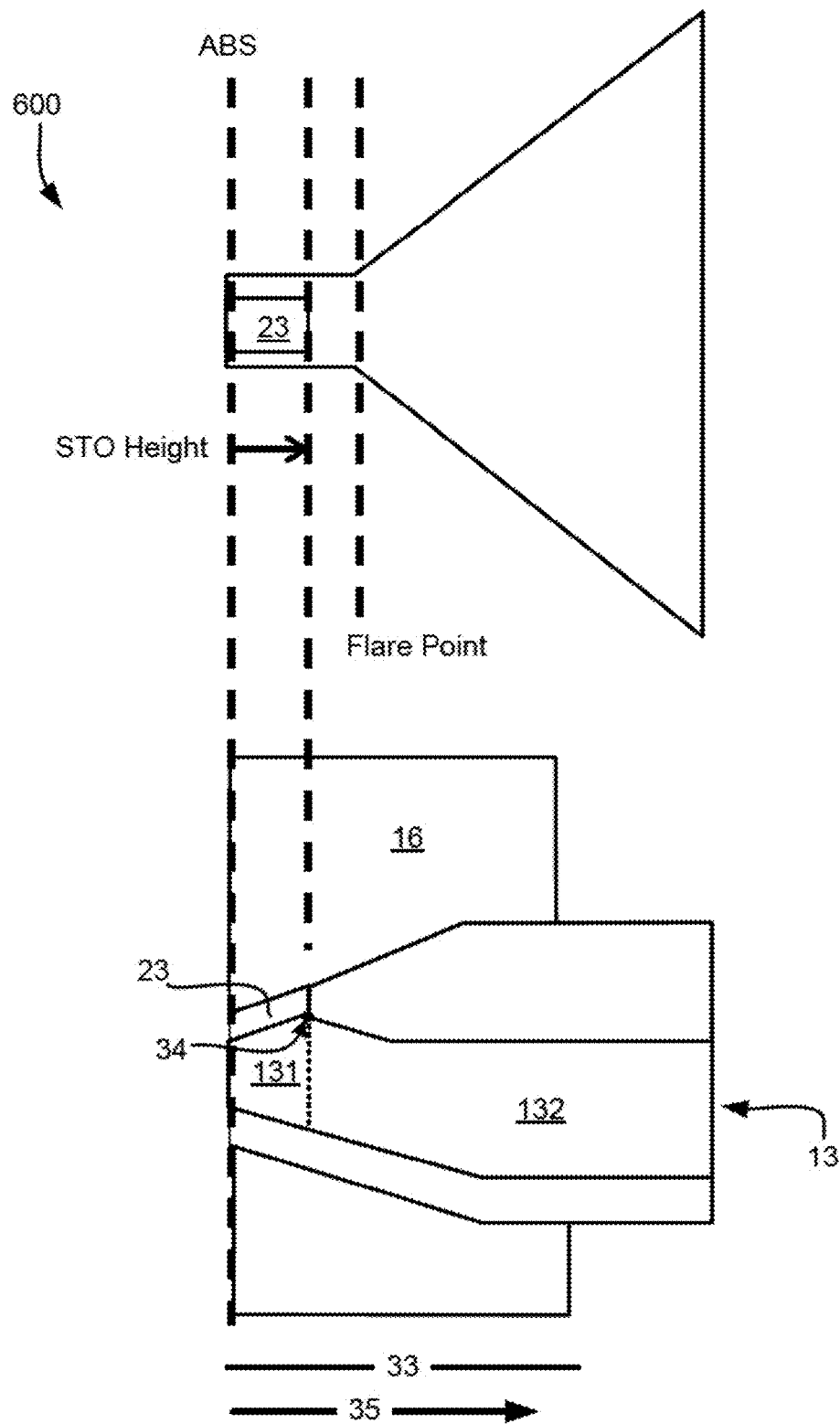
FIG. 6A shows a top view and a cross-sectional view of a MAMR head according to one embodiment.

As shown in FIG. 6A, which shows a cross-sectional diagram of a portion of a MAMR head 600 in which at least some of a thickness of the main pole 13 is decreased in a direction away from the ABS from the STO height position. In other words, a recessed-type main pole structure is shown in which the trailing edge side of the main pole from the STO height position of the STO forming surface of the main pole is removed from the STO forming surface to the substrate side. According to this embodiment, because the recess is formed thinner than the surrounding magnetic material, the magnetic flux flowing to the main pole is throttled. As a result, because the magnetic field intensity from the main pole may be controlled in the section away from the ABS from the STO height and, in addition, the relative contribution of the magnetic field intensity is reduced, a MAMR head in which the dependency of the flare length is small is possible.

In addition, the use of this recess-shaped structure, because the magnetic field intensity of the main pole is not dependent upon the flare shape, allows for a current to be uniformly supplied to the STO film surface. This has the effect of ensuring the production of a stable high-frequency magnetic field from the STO.

Figure 6B:
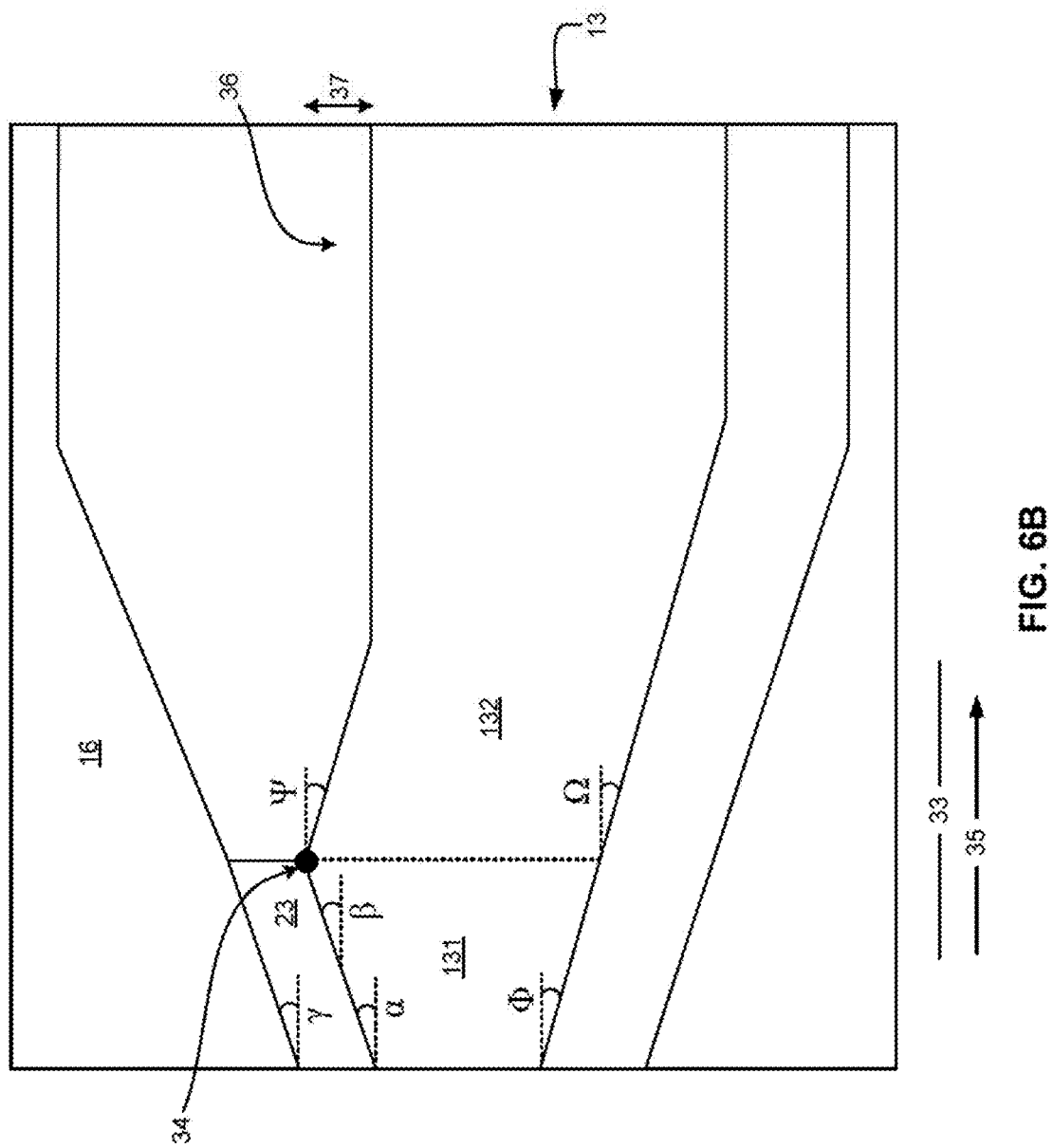
FIG. 6B shows a close-up view of a portion of the MAMR head shown in FIG. 6A, according to one embodiment.

A close-up view of a portion of the MAMR head 600 in FIG. 6A is shown in FIG. 6B, which illustrates some of the angles that surfaces form relative to the plane of deposition 33.

As shown in FIGS. 6A-6B, according to one embodiment, a magnetic head may comprise a main pole 13 configured to emit a recording magnetic field for affecting a magnetic medium, the main pole configured to serve as a first electrode and having a front portion 131 at an air bearing surface (ABS) of the magnetic head and a rear portion 132 extending from the front portion in an element height direction 35 perpendicular to the ABS. An upper surface of the front portion of the main pole is angled with respect to a plane of deposition 33 at a first angle $\alpha$ of inclination of greater than 0°, and at least a portion of an upper surface of the rear portion of the main pole is angled at a first angle $\Psi$ of declination greater than 0° with respect to the plane of deposition. The magnetic head also comprises an upper shield (trailing shield) 16 positioned above the main pole, the upper shield configured to serve as a second electrode. Also, the magnetic head comprises a microwave oscillator (STO element) 23 positioned between the main pole and the upper shield at the ABS. That is, in one approach, the microwave oscillator may include a STO.

The microwave oscillator may be configured to generate a high-frequency magnetic field which is superimposed with the recording magnetic field in order to record data to the magnetic medium when current flows to the microwave oscillator via the first electrode and the second electrode.

Also, the upper surface of the front portion of the main pole may be inclined along the element height direction from the ABS at the first angle of inclination, while at least a lower surface of the microwave oscillator may be inclined along the element height direction from the ABS at a second angle $\beta$ of inclination substantially equal to the first angle. As shown, the first and second angles of inclination are formed between the same two surfaces however, should another layer be positioned between the microwave oscillator and the main pole, these angles would appear on different surfaces, and therefore may be different angles with respect to the plane of deposition.

In addition, the inclination of the upper surface of the main pole may be different than the inclination of the STO element, in some approaches.

According to one approach, an upper surface of the microwave oscillator may be inclined along the element height direction from the ABS at a third angle $\gamma$ of inclination substantially equal to the second angle of inclination, or greater or less.

In other approaches, the angles of inclination may be different, such as an STO element which is thicker at a rear portion than at a front portion, or vice versa, other layers being present, etc.

Due to the shape of the main pole, an inflection point 34 is positioned at a junction between the front portion 131 and the rear portion 132 of the main pole, and at least a portion of the upper surface of the rear portion of the main pole declining along the element height direction from the inflection point at the first angle of declination. Furthermore, a lower surface of the front portion of the main pole may be declined along the element height direction from the ABS at a second angle $\Phi$ of declination greater than 0°, while at least a portion of a lower surface of the rear portion of the main pole may be declined along the element height direction from the ABS at a third angle $\Omega$ of declination. In one embodiment, the third angle of declination may be substantially equal to the second angle of declination, or greater or less.

In some approaches, the upper surface of the main pole may include a recess 36 (the indented portion that has been removed) having a depth 37 of between about 50 nm and 120 nm at some position behind the inflection point in the element height direction. The depth may be measured from a line in the element height direction transecting the inflection point to an upper surface of the main pole at a lowest point of the recess.

Figure 7A:
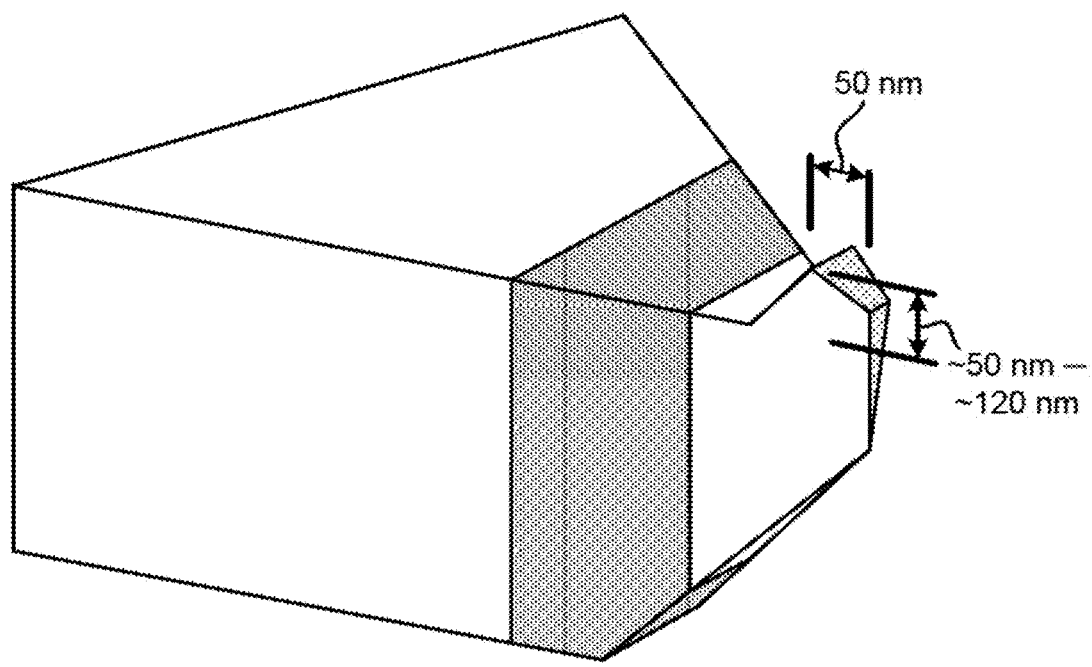
FIG. 7A shows a model for a MAMR head, according to one exemplary embodiment.
Figure 7B:
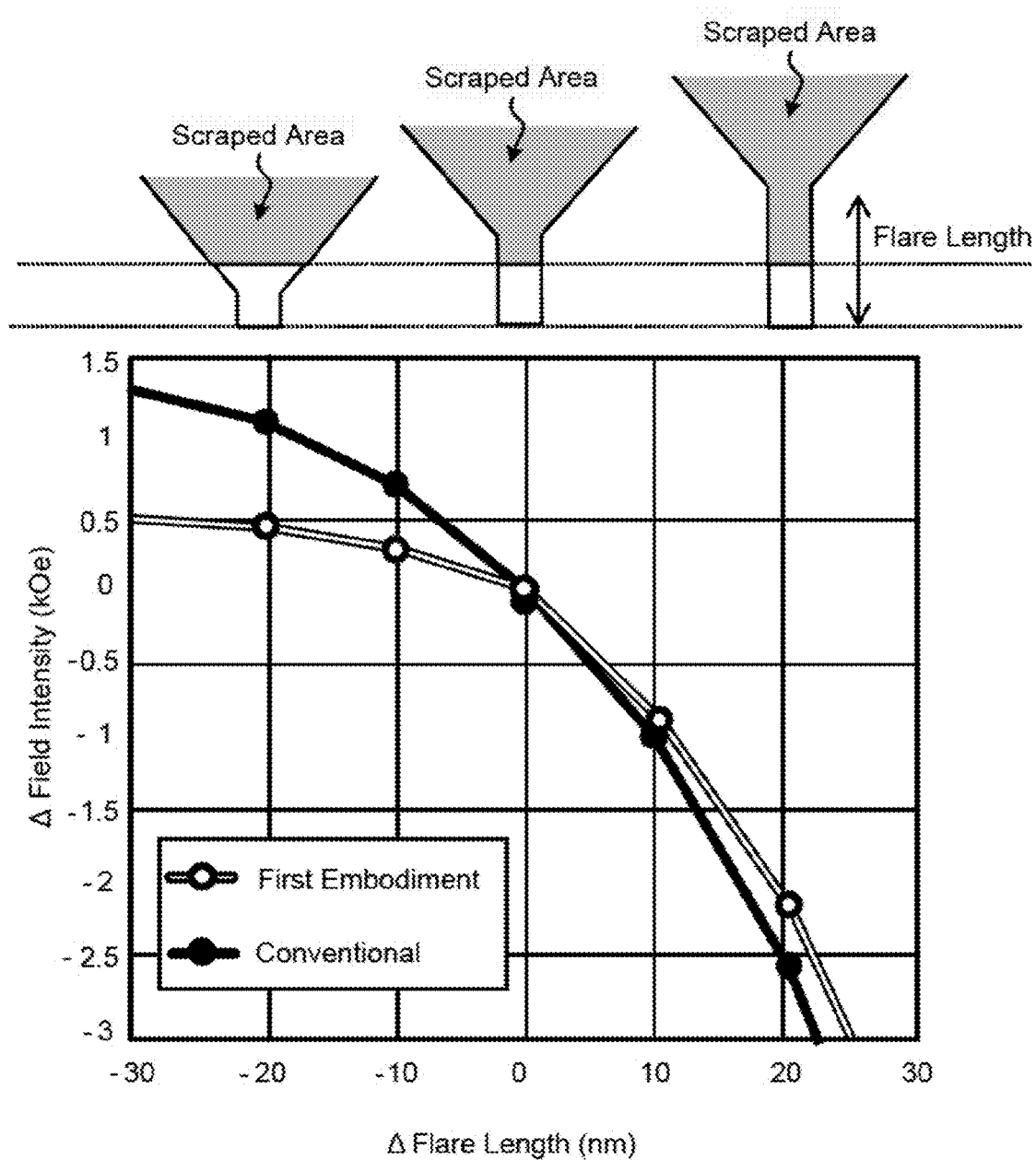
FIG. 7B shows a relationship between flare length and magnetic field intensity, according to the exemplary embodiment.

FIG. 7A shows a model for a MAMR head, and FIG. 7B shows calculated results from testing this MAMR head according to one exemplary embodiment. According to the model for the MAMR head shown in FIG. 7A, the distance from the ABS to the scraping tip corresponding to the STO height is about 50 nm, and the scraping depth of the main pole is about 120 nm. Of course, other STO heights and scraping depths are possible as would be understood by one of skill in the art. For example, the STO height may be from about 25 nm to about 100 nm in some approaches, while the scraping depth of the main pole may be from about 60 nm to about 200 nm, in other approaches.

FIG. 7B shows a comparison of the dependency on flare length of the magnetic field intensity between a MAMR head according to one embodiment and a prior art head. It is clear that the flare length dependency is comparatively smaller in the MAMR head according to one embodiment. More particularly, it is clear that a small change in the magnetic field intensity occurs in a region in which the flare length is short. This indicates that the permissible range of flare length change with respect to a fixed magnetic field intensity specification range is large. A large flare length permissible range implies that, when the ABS is processed in such a way as to satisfy the STO height specification, there is a strong possibility that the flare length specification will be met in the absence of any additional special considerations.

Tables 1-3 show examples of specific calculations of the effects of using a magnetic head formed according to a first embodiment on yield.

TABLE 1

Yield Estimation for Field Intensity

| | Field Intensity Specification | Flare Length Specification | Fabrication Variation | Yield |
|---|---|---|---|---|
| PMR | ± 1 kOe | ± 15 nm | $\sigma$ = 10 nm | 86.6% |
| MAMR | | | | 86.6% |
| First Embodiment | | ± 22.5 nm | | 97.5% |

TABLE 2

Yield Estimation for STO Height

|  | STO Specification | Fabrication Variation | Yield |
|---|---|---|---|
| PMR | — | — | — |
| MAMR | ± 15 nm | σ = 10 nm | 86.6% |
| First Embodiment |  |  |  |

TABLE 3

Estimation of Total Yield

|  | Yield for Flare Length Specification | Yield for STO Height Specification | Total Yield |
|---|---|---|---|
| PMR | 86.6% | — | 86.6% |
| MAMR | 86.6% | 86.6% | 75.0% |
| First Embodiment | 97.5% |  | 84.4% |

For example, taking the recording magnetic field intensity specification range as ±1 KOe, it is clear from FIG. 7B that, for a conventional PMR head based on a Δflare length unit, the corresponding flare length range lies between −30 nm and 10 nm. On the other hand, for a main pole according to the first embodiment, although accurate evaluation is difficult because of the range outside the range of the graph, because of the essentially negligible increase in the magnetic field intensity in the region in which the Δflare length is small, the Δflare length corresponding to +1 KOe may be estimated as lying in a range of at least −35 nm to 10 nm. As illustrated in the table, fabrication variation having its origin in production precision is, typically, of the order of σ=10 nm. Assuming a flare length distribution compliant with a standard normal distribution, when σ=10 nm and the aforementioned specifications are satisfied, the yield of a PMR head/existing MAMR head is 86.6%, while the yield of a magnetic head according to the first embodiment is 97.5%, a vast improvement.

Table 2 shows the yield with respect to the STO height. Assuming the STO height specification as ±15 nm and assuming the fabrication variation as σ=10 nm, the yield for a conventional MAMR head or a head according to the first embodiment is 86.6%.

Table 3 shows the total yield. In a normal PMR head, because of the absence of an STO, the 86.6% result is based on the flare length specification alone. In contrast, in a conventional MAMR head, because the yield of the head is based on a sum of the yield based on the flare length specification and the yield based on the STO specification, the result drops to 75%. In contrast, according to the first embodiment, because of the improved flare length yield, the yield of the head is 84.4%, and this value compares very favorably with existing PMR heads which do not employ MAMR and thus do not benefit from the use of MAMR.

A working example is now described with reference to the figures. Functional elements common to the figures are denoted using the same symbols.

Figure 8A:
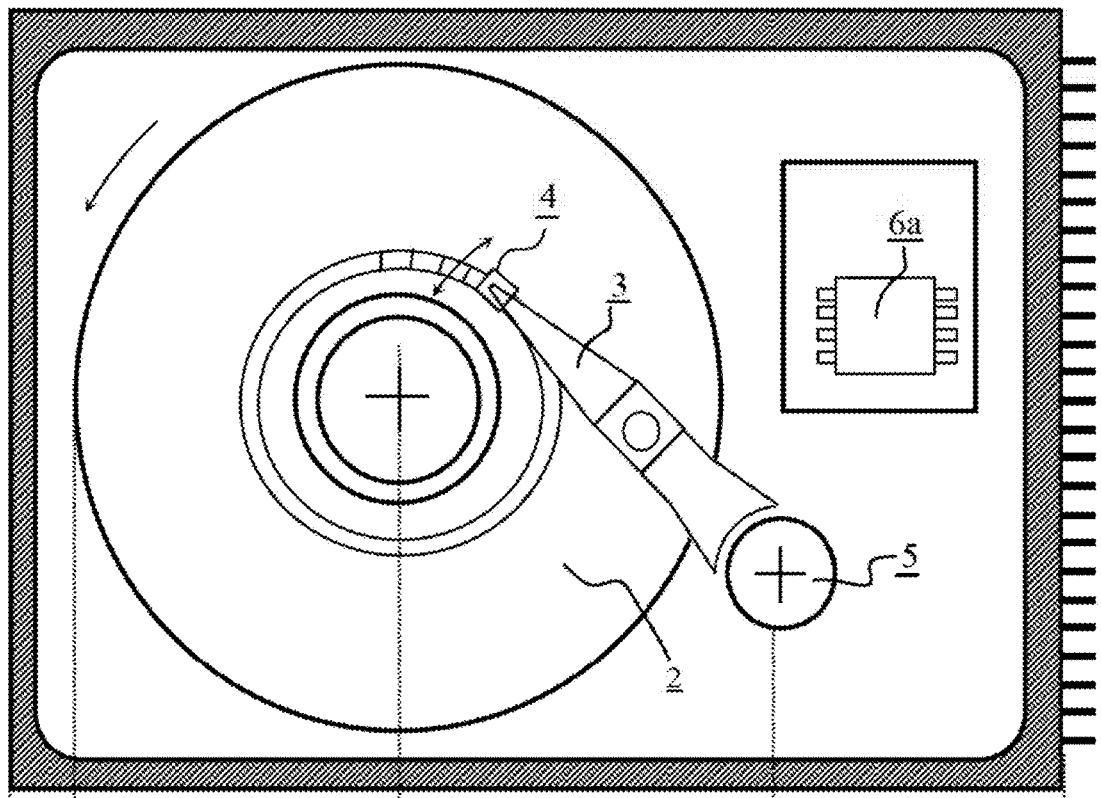
FIGS. 8A-8B are schematic diagrams of a magnetic reading/writing device, according to one embodiment.
Figure 8B:
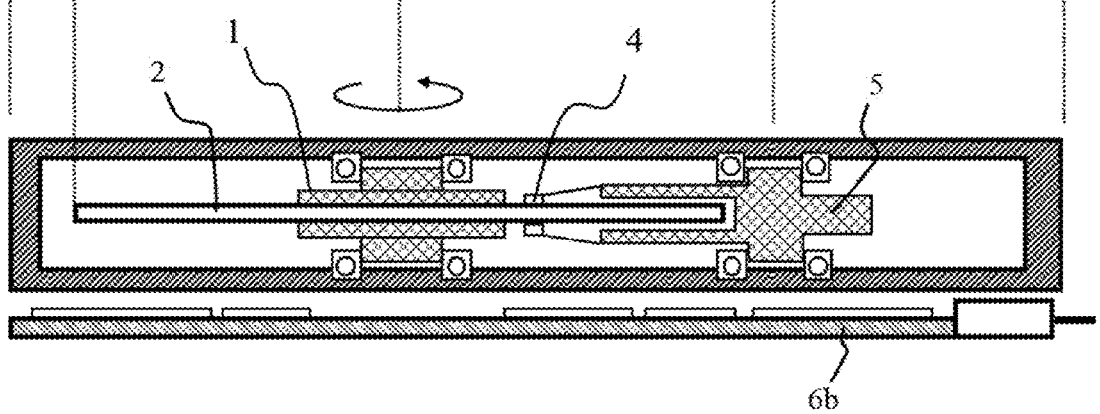

FIGS. 8A-8B are schematic diagrams of a magnetic reading/writing device, according to one embodiment. FIG. 8A is a schematic plan view while FIG. 8B is a schematic cross-sectional view. The magnetic recording/reproducing device uses a magnetic head mounted on a slider 4 fixed to the distal end of a suspension arm 3 to perform recording/reproducing of a magnetization signal on a prescribed position of a magnetic disk (magnetic recording medium) 2 rotated by a drive motor 1. A rotary actuator 5 is driven to afford the selection of the magnetic disk radial position (track). The recording signal on the magnetic head and the read signal from the magnetic head are processed by signal processing circuits 6a, 6b.

The above description of a typical magnetic disk storage system, and the accompanying illustration of FIG. 8 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the magnetic medium.

As would be understood by one of skill in the art, a magnetic storage device may include some or all of the following elements; at least one magnetic head, a magnetic medium, a drive mechanism for passing the magnetic medium over the at least one magnetic head, and a controller electrically coupled to the at least one magnetic head for controlling operation of the at least one magnetic head.

Figure 9:
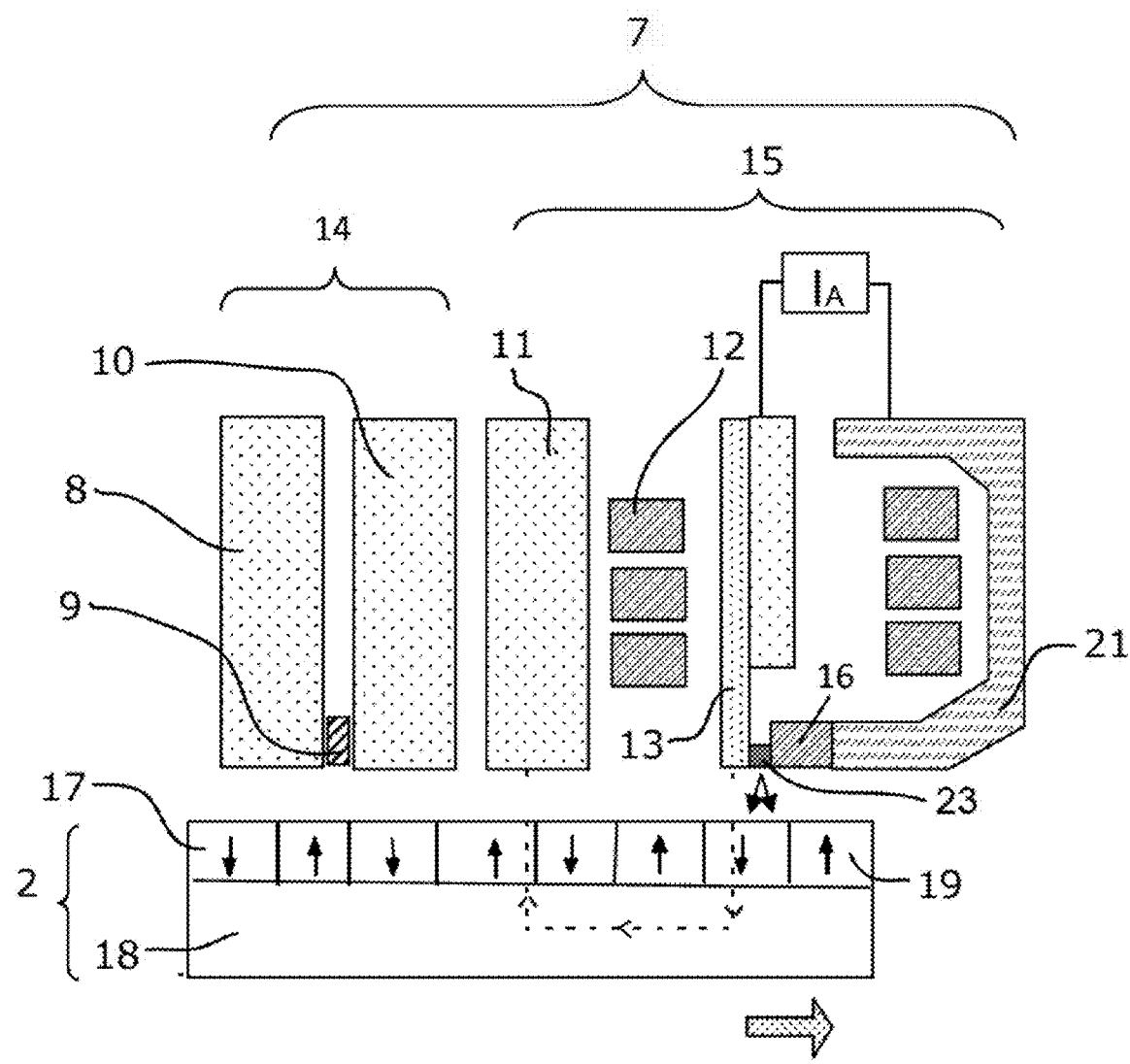
FIG. 9 is schematic diagram of a STO-mounted perpendicular recording operation, in one embodiment.

FIG. 9 is a schematic diagram of a system capable of MAMR which shows the relationship between an STO-mounted perpendicular magnetic head 7 and the magnetic disk 2. The STO-mounted perpendicular magnetic head 7 in one embodiment comprises, from the leading side of the head, a reading head 14 comprising a lower reading shield 8, a reading element or device 9, and an upper reading shield 10. Also included is an STO-mounted recording head 15 laminated in sequence on an auxiliary pole 11, a thin film coil 12, a main pole 13, a microwave-generating STO element 23, a trailing shield 16, and an upper pole 21. The STO element 23 is formed between the main pole 13 and the trailing shield 16. The main pole 13 and upper pole 21 serve not only just as poles for STO element transmission, but may be employed as electrodes for STO element 23 transmission.

In normal perpendicular magnetic recording, a magnetic circuit in which the magnetic field emitted from the main pole 13 of the recording head 15 passes through a magnetic recording layer 17 and a soft magnetic underlayer 18 of the magnetic disk 2 and infiltrates the auxiliary pole 11 is formed, and a magnetization pattern 19 is recorded in the magnetic recording layer 17. In a MAMR system, the magnetization pattern 19 is recorded at this time when a current flows between the main pole 13 and upper pole 21, and the high-frequency magnetic field from the STO element 23 is applied to the recording medium 2 to reduce the coercivity of the medium.

In other embodiments, a giant magnetoresistance device (GMR) or tunnel magnetoresistance device (TMR) or the like may be employed as the reproducing device 9 of the reproducing head 14.

FIGS. 10A-10K show a method in process flow by which a MAMR head may be formed, according to one embodiment. The formation method is based on a damascene process in which trenches are formed by dry etching, and the main pole is fabricated by pole plating. The following description focuses on the microwave oscillator (STO element) formation process.

FIG. 10A shows a main pole 13 that has a trailing edge taper (TET) structure which comprises the main pole 13 in the trailing direction and a non-magnetic film 22 laminated above the main pole having a tapered edge on an end toward the ABS (in the ABS direction). The TET structure may be used in embodiments described herein. In this way, the non-magnetic film 22 is formed above a back portion of the main pole 13, with the non-magnetic layer not being formed above the main pole near the ABS. The non-magnetic layer prevents removal of the main pole positioned below the non-magnetic layer when removing the portion of the main pole using the mask (described later).

FIG. 10B shows an STO sensor film 23 and a stopper film 24 formed above the main pole 13 of this TET structure. The stopper film 24 may comprise a carbon film, Ta, or the like. The stopper film 24 is formed full film over all components of the TET structure.

FIG. 10C shows a cross-sectional view and an ABS view of the next formation operation. As shown, the processing of a resist portion 25 in the cross-track direction for the purpose of processing the STO sensor film 23 on the main pole 13 is formed. In addition, for the purpose of fabricating a minute STO pattern (track direction), a short wavelength ArF scanner may be used. In addition, the resist 25 need not be formed as a single layer, and the use of a multi-layer resist structure is also possible.

FIG. 10D shows a cross-sectional view and an ABS view of the next formation operation. As the cross-sectional view shows, the resist 25 may be used as a mask for the processing of the track portion of the STO sensor film 23, such as via ion milling, etching, or the like. The fabrication of an insulation film 26 used to insulate the STO element, and then the fabrication of a second stopper film 27 is also shown. While alumina is desirably used as the insulation material, $SiO_2$, $Al_2O_3$, $Al_2O_3$—$SiO_2$, and similar materials may be used. In addition, as the stopper member, the use of a carbon film, Ta or similar material is desirable.

FIG. 10E shows the resist subsequent to a polishing processing, which may be performed using chemical mechanical planarization (CMP) or the like. The STO sensor film 23 is protected by the stopper film 24 and the insulation film 26 is protected by the second stopper film 27 and, as a result, the desired shape is able to be fabricated with high yield.

Figure 10F:
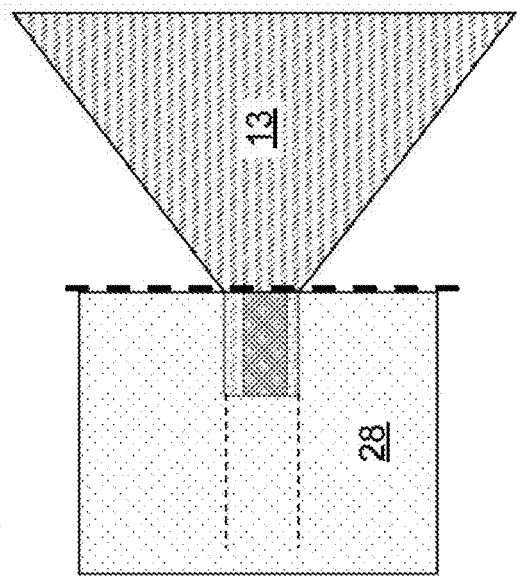
Figure 10F:
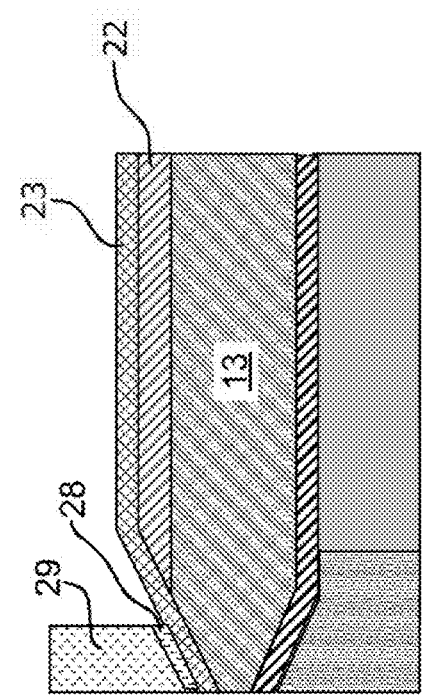

FIGS. 10F-10K show the process flow for the fabrication in the STO end portion direction which provide the unique shape of the embodiments described herein. Similar to FIGS. 10A-10D which describe the track portion fabrication process, a stopper film 28 and a resist 29 for fabricating the STO end portion are initially formed. In order to achieve the required positional accuracy, an ArF scanner or similar may be used as the height fabricating resist. In addition, either a single layer resist and a multi-layer resist may be used. As shown in FIG. 10F, an STO height pattern 23 is fabricated above the main pole 13 using the stopper film 28 and resist 29.

As shown, the resist 29 serves as a mask and has an end portion (denoted by the dashed line) parallel to the ABS that is positioned a predetermined distance from the ABS in the element height direction.

Figure 10G:
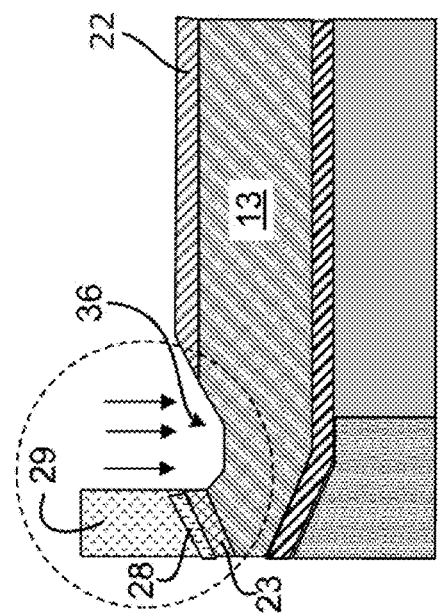

FIG. 10G shows how, with the stopper film 28 and resist 29 serving as a mask, the STO 23 and the main pole 13 are collectively removed (scraped), such as via ion milling or the like, to form a recessed portion or recess 36 thereof. That is to say, the section scraped deeper than the height end portion of the STO element 23 and the height end portion of the STO element forming surface of the main pole 13 are formed in the same process step.

The desirable scraping amount is, as shown in FIG. 7, between about 50 nm and about 120 nm. In one embodiment, because the STO sensor film 23 and main pole 13 are scraped using a single mask, highly precise formation based on self-alignment is possible. In one embodiment, the portion of the main pole 13 exposed (not covered by the stopper film 28 and resist 29) is not completely removed in order to maintain the ability to read signals from a medium.

Because of this process, the main pole 13 comprises a front portion at the ABS and a rear portion extending from the front portion in an element height direction perpendicular to the ABS. This scraping technique causes a portion of the main pole 13 and a back portion of the STO sensor film 23 to be removed using the mask 29 to form an end of the STO sensor film 23 positioned a predetermined distance from the ABS in the element height direction.

Figure 11:
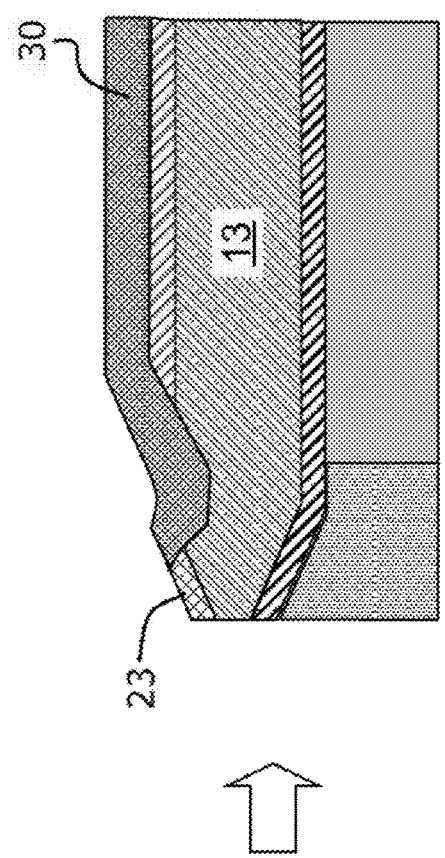
FIG. 11 is a diagram showing another process flow according to another embodiment.
Figure 11:
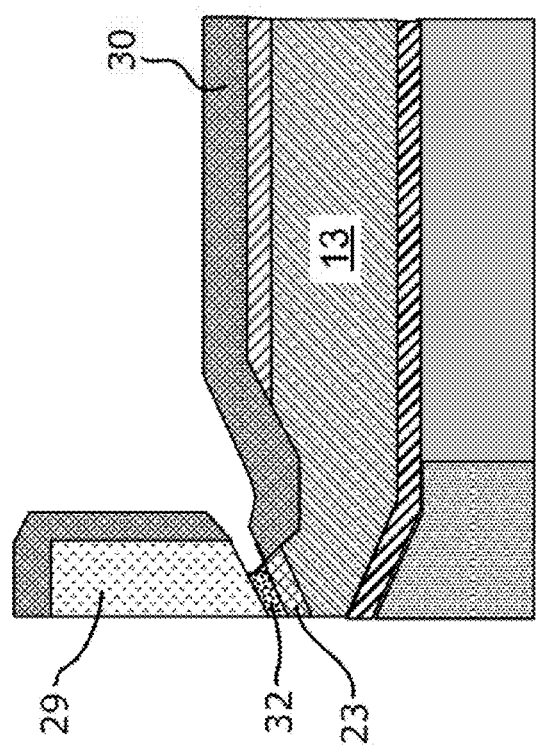

FIG. 11 shows another formation process according to another embodiment. In this embodiment, a PMGI 32 and STO end portion dual-layer resist method may be employed. However, whichever process is used, the final structure obtained thereby is the same.

Figure 10H:
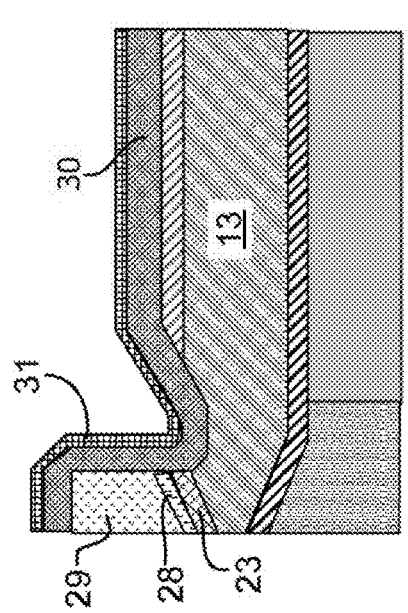

FIG. 10H shows fabrication of an insulation film 30 and stopper film 31 in the STO end portion direction. While an alumina film may be employed as the insulation film, $SiO_2$, $Al_2O_3$, $Al_2O_3$—$SiO_2$, and similar materials may be used. In addition, similar to the track portion, a carbon film, Ta, or the like may be used as the stopper member. The resist subsequent to a polishing process, such as via CMP, is shown. The STO sensor film 23 is protected by the stopper film 28 and the insulation film 30 is protected by the second stopper film 31 and, as a result, the desired shape is able to be fabricated with high yield.

Figure 10J:
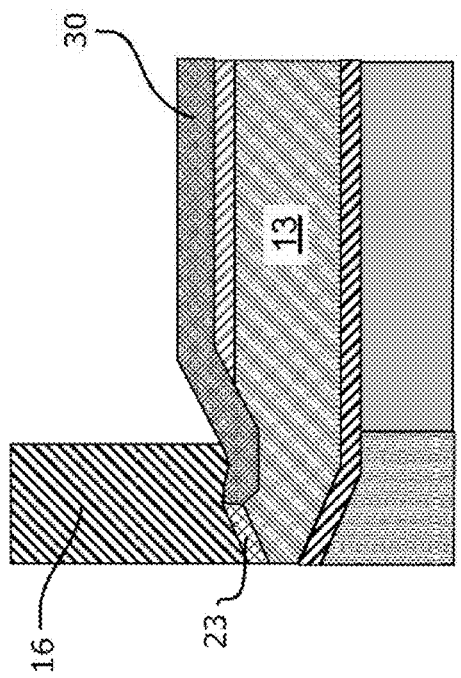
Figure 10I:
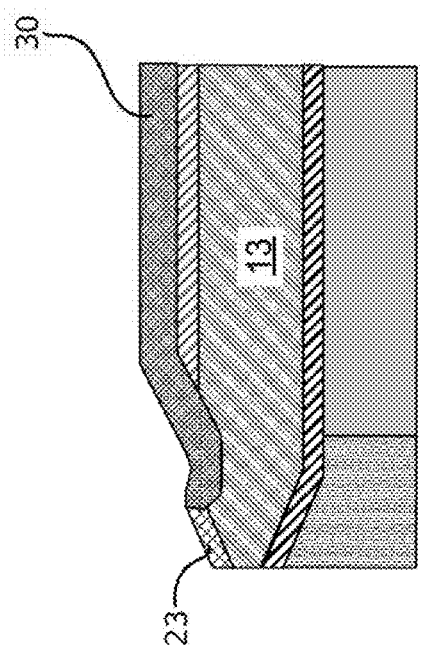

FIG. 10J is a diagram of the formation of the trailing shield (upper shield) 16. As shown, the trailing shield may be formed above the structure near the ABS, and may extend beyond the end of the STO sensor film 23 in the element height direction. In one embodiment, the trailing shield may be configured to serve as a second electrode.

Figure 10K:
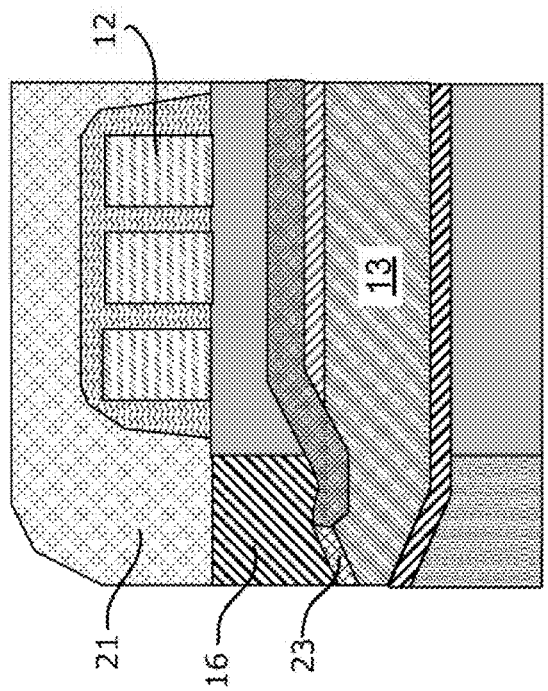

FIG. 10K shows the formation of the thin film coil 12 and the upper pole 21, which complete the formation of the MAMR head in one approach.

Conventionally recognized materials may be used for all structures, elements, and layers described herein, unless otherwise noted.

In this formation method, the main pole 13 may be formed above a substrate or some other elements or components of the magnetic head. The main pole is configured to serve as a first electrode and comprises a front portion at the ABS of the magnetic head and a rear portion extending from the front portion in an element height direction perpendicular to the ABS.

Furthermore, the STO sensor film 23 (microwave oscillator structure) is formed above the main pole (and preferably in contact with the main pole). The microwave oscillator is positioned at the ABS and extends therefrom in the element height direction. Also, in order to form the recess in the main pole and, in the same process, form a rear end of the STO element, a mask 29 is formed above the STO sensor film, the mask having an end portion parallel to the ABS that is positioned a predetermined distance from the ABS in the element height direction. This predetermined distance dictates the height of the STO element after formation thereof. According to various embodiment, this predetermined distance may be from about 5 nm to about 500 nm, such as about 50 nm in one approach. Of course, any other suitable distance may be used as would be understood by one of skill in the art.

In addition, a back portion of the STO sensor film is removed in this method using the mask to form an end of the STO sensor film positioned the predetermined distance from the ABS in the element height direction, while a portion of the main pole is removed using the mask to form the recess.

In another embodiment, removing the portion of the main pole causes an upper surface of the front portion of the main pole to be inclined at a first angle of inclination with respect to a plane of deposition thereof and at least a portion of an upper surface of the rear portion of the main pole to be declined at a first angle of declination with respect to the plane of deposition. The first angle of inclination may be greater than 0°, and the first angle of declination may greater than 0°, thereby actually providing inclination or declination of the surface in question. Furthermore, an inflection point is positioned at a junction between the front portion and the rear portion of the main pole, and the main pole and the microwave oscillator may be removed via etching or milling in a single operation such that the end of the microwave oscillator is self aligned with the inflection point. In another approach, removing the portion of the main pole causes a recess that may have a depth of between about 50 nm and 120 nm, in some approaches.

It should be noted that methodology presented herein for at least some of the various embodiments may be implemented, in whole or in part, in computer hardware, software, by hand, using specialty equipment, etc., and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
   a main pole configured to emit a recording magnetic field for affecting a magnetic medium, the main pole configured to serve as a first electrode and having a front portion at an air bearing surface (ABS) of the magnetic head and a rear portion extending from the front portion in an element height direction perpendicular to the ABS, wherein an upper surface of the front portion of the main pole is angled with respect to a plane of deposition at a first angle of inclination of greater than 0°, and wherein at least a portion of an upper surface of the rear portion of the main pole is angled at a first angle of declination greater than 0° with respect to the plane of deposition;
   an upper shield positioned above the main pole, the upper shield configured to serve as a second electrode; and
   a microwave oscillator positioned between the main pole and the upper shield at the ABS.

2. The magnetic head as recited in claim 1, wherein the microwave oscillator is configured to generate a high-frequency magnetic field which is superimposed with the recording magnetic field in order to record data to the magnetic medium when current flows to the microwave oscillator via the first electrode and the second electrode.

3. The magnetic head as recited in claim 1, wherein the upper surface of the front portion of the main pole inclines along the element height direction from the ABS at the first angle of inclination.

4. The magnetic head as recited in claim 3, wherein at least a lower surface of the microwave oscillator inclines along the element height direction from the ABS at a second angle of inclination relative to the plane of deposition, the second angle of inclination being substantially equal to the first angle of inclination.

5. The magnetic head as recited in claim 4, wherein an upper surface of the microwave oscillator inclines along the element height direction from the ABS at a third angle of inclination relative to the plane of deposition, the third angle of inclination being substantially equal to the second angle of inclination.

6. The magnetic head as recited in claim 1, wherein an inflection point is positioned at a junction between the front portion and the rear portion of the main pole, and wherein the portion of the upper surface of the rear portion of the main pole declines along the element height direction from the inflection point at the first angle of declination.

7. A magnetic head, comprising:
   a main pole configured to emit a recording magnetic field for affecting a magnetic medium, the main pole configured to serve as a first electrode and having a front portion at an air bearing surface (ABS) of the magnetic head and a rear portion extending from the front portion in an element height direction perpendicular to the ABS, wherein an upper surface of the front portion of the main pole is angled with respect to a plane of deposition at a first angle of inclination of greater than 0°, and wherein at least a portion of an upper surface of the rear portion of the main pole is angled at a first angle of declination greater than 0° with respect to the plane of deposition;
   an upper shield positioned above the main pole, the upper shield configured to serve as a second electrode; and
   a microwave oscillator positioned between the main pole and the upper shield at the ABS,
   wherein an inflection point is positioned at a junction between the front portion and the rear portion of the main pole, and wherein the portion of the upper surface of the rear portion of the main pole declines along the element height direction from the inflection point at the first angle of declination,
   wherein the upper surface of the main pole comprises a recess having a depth of between about 50 nm and 120 nm, the recess being positioned past the inflection point in the element height direction from the ABS.

8. The magnetic head as recited in claim 1, wherein a lower surface of the front portion of the main pole declines along the element height direction from the ABS at a second angle of declination relative to the plane of deposition, the second angle of declination being greater than 0°.

9. The magnetic head as recited in claim 8, wherein at least a portion of a lower surface of the rear portion of the main pole declines along the element height direction from the ABS at a third angle of declination relative to the plane of deposition, the third angle of declination being substantially equal to the second angle of declination.

10. The magnetic head as recited in claim 1, wherein the microwave oscillator comprises a spin torque oscillator (STO), wherein the STO has a height perpendicular to the ABS in a range between about 5 nm and about 100 nm.

11. A magnetic storage device, comprising:

at least one magnetic head as recited in claim 1;

the magnetic medium;

a drive mechanism for passing the magnetic medium over the at least one magnetic head; and a controller electrically coupled to the at least one magnetic head for controlling operation of the at least one magnetic head.

12. The magnetic head as recited in claim 4, wherein an upper surface of the microwave oscillator inclines along the element height direction from the ABS at a third angle of inclination greater than 0° relative to the plane of deposition, wherein the third angle of inclination and the first angle of inclination are different.

13. The magnetic head as recited in claim 7, wherein the upper surface of the front portion of the main pole inclines along the element height direction from the ABS at the first angle of inclination, wherein at least a lower surface of the microwave oscillator inclines along the element height direction from the ABS at a second angle of inclination relative to the plane of deposition, the second angle of inclination being substantially equal to the first angle of inclination.

14. The magnetic head as recited in claim 7, wherein a lower surface of the front portion of the main pole declines along the element height direction from the ABS at a second angle of declination relative to the plane of deposition, the second angle of declination being greater than 0°, wherein at least a portion of a lower surface of the rear portion of the main pole declines along the element height direction from the ABS at a third angle of declination relative to the plane of deposition, the third angle of declination being substantially equal to the second angle of declination.

* * * * *